United States Patent Office 3,230,214
Patented Jan. 18, 1966

3,230,214
PREPARATION OF 6-AMINOACYLPENICILLANIC ACIDS
George Robert Fosker, Horsham, Sussex, and John Herbert Charles Nayler, Cliftonville, Dorking, Surrey, England, assignors to Beecham Group Limited, Brentford, Middlesex, England, a British company
No Drawing. Filed Nov. 26, 1963, Ser. No. 326,249
Claims priority, application Great Britain, Nov. 27, 1962, 44,728/62
6 Claims. (Cl. 260—239.1)

This invention relates to a process for the production of penicillins and is particularly concerned with a process for the preparation of α-amino-substituted penicillins.

The present invention provides a process for the preparation of penicillins of the general formula:

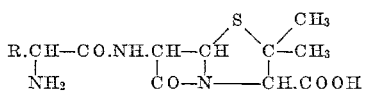

and non-toxic salts thereof, wherein R is a hydrogen atom or an alkyl, aryl, aralkyl or heterocyclic group which may also be substituted, which process comprises coupling 6-aminopenicillanic acid with the appropriate N-protected amino-substituted carboxylic acid prepared by reacting the amino-substituted carboxylic acid with an aldehyde, and thereafter hydrolysing the N-protected penicillin formed.

The aldehyde employed to form the N-protected amino-substituted carboxylic acid is preferably an aromatic or heteroaromatic aldehyde containing an ortho hydroxyl substituent, such as salicylaldehyde, 5-chlorosalicylaldehyde, 3,5-dichloro-salicylaldehyde, 2-hydroxy-1-naphthaldehyde, or 3-hydroxypyridine-4-aldehyde.

The N-protected penicillins are preferably prepared by reacting 6-aminopenicillanic acid with a mixed anhydride prepared by reacting the N-protected amino-substituted carboxylic acid with an ester of chlorocarbonic acid, e.g. ethyl chlorocarbonate.

Other methods used to form the N-protected penicillin are standard procedures in peptide synthesis and include the use of dicyclohexylcarbodiimide and carbonyldiimidazole.

The subsequent regeneration of the free amino-substituted penicillin is effected by mild hydrolysis of the N-protected compound, e.g. with very dilute mineral acid.

The compounds formed by the process of the present invention are of value as antibacterial agents, as nutritional supplements in animal feeds, as agents for the treatment of mastitis in cattle and as therapeutical agents in poultry and animals, including man, in the treatment especially of infectious diseases caused by Gram-positive and Gram-negative bacteria.

The penicillins of the present invention may exist in epimeric forms and it will be understood that the invention includes such forms.

The following examples illustrate the invention:

Example 1

A suspension of DL-norvaline (3.5 g.) and 2-hydroxy-1-naphthaldehyde (5.2 g.) in a mixture of ethanol (250 ml.) and methanol (20 ml.) was refluxed until a clear yellow solution resulted. The mixture was then evaporated under reduced pressure and the residue was washed with ether and recrystallised from ethanol to give yellow crystals of N-(2-hydroxy-1-naphthylmethylene)-DL-norvaline (5 g.), M.P. 171 to 173° (decomposition).

This N-protected amino-acid (2.7 g.) was dissolved in a mixture of dry acetone (100 ml.), dioxan (25 ml.) and 2,6-lutidine (1.35 ml.). The solution was rapidly chilled to —5°, treated with ethyl chlorocarbonate (0.95 ml.) and stirred at 0° for 10 minutes, during which lutidine hydrochloride was precipitated and the mixed anhydride formed in solution. The suspension was then cooled to —45° and stirred vigorously whilst an ice-cold solution of 6-aminopenicillanic acid (2.15 g.) in 3% aqueous sodium bicarbonate (28 ml.) was added as rapidly as possible, the temperature of the mixture never being allowed to rise above 0°. The resulting yellow solution was stirred for 30 minutes, at 0° and then for a further 30 minutes without external cooling. It was then extracted with ether (3 x 150 ml.), only the aqueous phase being retained. The latter was brought to pH 2 by addition of dilute hydrochloric acid and rapidly extracted with ether (100 ml. in 3 portions). These second ether extracts, containing the N-protected penicillin, were washed with water (10 ml.) and then extracted with sufficient 3% sodium bicarbonate to give a neutral aqueous phase, which was separated and evaporated at low temperature and pressure. The residue (2 g.) was shown, by paper chromatography of a small portion, to contain the sodium salt of the N-protected penicillin and a little free α-aminobutylpenicillin.

In order to complete the removal of the N-arylidene group, the above product was dissolved in water (50 ml.), adjusted to pH 2 by addition of dilute hydrochloric acid, and treated with sufficient acetone to redissolve an initial precipitate. The yellow solution was stirred for 45 minutes and then extracted with ether (3 x 50 ml.) to remove 2-hydroxy-1-naphthaldehyde. The colourless aqueous phase was readjusted to pH 7 with sodium bicarbonate and then evaporated to dryness at low temperature and pressure. The residual α-aminobutylpenicillin (1.6 g., after drying over phosphorus pentoxide in vacuo) was estimated by colorimetric assay with hydroxylamine to be 41% pure. The identity of the product was confirmed by paper chromatography.

Example 2

A warm solution of 2-hydroxy-1-naphthaldehyde (10.5 g.) in ethanol (50 ml.) was added with stirring to a solution of α-aminophenylacetic acid (9 g.) in 2 N sodium hydroxide (30 ml.) and ethanol (10 ml.). The mixture was stirred and warmed until an initial precipitate redissolved, then cooled rapidly whereupon an amorphous yellow solid separated. This product was collected, washed with ether, and crystallised from ethanol to give fine yellow crystals of sodium N-(2-hydroxy-1-naphthylmethylene)-α-aminophenyl acetate (13.5 g. decomposition point 228 to 230°).

A suspension of this sodium salt (3.25 g.) in a mixture of dry acetone (85 ml.) and dioxan (5 ml.) was treated with pyridine (3 drops) and cooled to —5°. Ethyl chlorocarbonate (0.95 ml.) was added and the mixture was stirred at 0° for 25 minutes, then cooled to —40° and filtered to remove sodium chloride. The filtrate, which contained the mixed anhydride, was cooled to —45° and stirred vigorously whilst an ice-cold solution of 6-aminopenicillanic acid (2.15 g.) in 3% aqueous sodium bicarbonate (28 ml.) was added as rapidly as possible, the temperature of the mixture not being allowed to rise above 0°. The resulting yellow solution was stirred for 30 minutes at 0° and then for a further 30 minutes without external cooling. It was then extracted with ether (2 x 100 ml.), only the aqueous phase being retained. This aqueous solution was brought to pH 2 by the addition of dilute hydrochloric acid and diluted with sufficient acetone to redissolve an initial precipitate. The resulting yellow solution was kept at room temperature for 30 minutes, then extracted with ether (3 x 100 ml.) to remove 2-hydroxy-1-naphthaldehyde.

The final aqueous solution was brought to pH 7 by addition of sodium bicarbonate and then evaporated at low temperature and pressure. The residual α-aminobenzylpenicillin (2.2 g., after drying over phosphorus pentoxide in vacuo) was estimated by colorimetric assay with hydroxylamine to be 43% pure.

*Example 3*

A suspension of DL-methionine (7.5 g.) and 2-hydroxy-1-naphthaldehyde (9 g.) in ethanol (150 ml.) was refluxed until dissolution was complete, then the yellow solution was evaporated under reduced pressure to leave a residue of N-(2-hydroxy-1-naphthylmethylene)-DL-methionine (11 g.), which after recrystallisation from ethanol had M.P. 164 to 165° (decomposition).

This N-protected amino-acid (3 g.) was coupled with 6-aminopenicillanic acid (2.15 g.) by the mixed anhydride procedure as described in Example 1. Removal of the N-protecting group was then accomplished by mild acid hydrolysis and the reaction mixture was worked up as described in Example 1 to give α-amino-β-methylthiopropylpenicillin (1.7 g.) which was estimated by colorimetric assay with hydroxylamine to be 39% pure.

*Example 4*

A suspension of sodium D(-) α-aminophenylacetate (12.4 g.) in ethanol (100 ml.) was treated with salicylaldehyde (7.5 ml.) and refluxed for 30 minutes to give a clear yellow solution. Crystallisation occurred on cooling and the product was collected, washed with ethanol, and dried in vacuo over phosphorus pentoxide to give sodium N-salicylidene α-aminophenylacetate (13.7 g.), M.P. 177–178° (decomposition).

A suspension of the above product (2.8 g.) in methylene dichloride (35 ml.) was chilled to −5° and treated with ethyl chlorocarbonate (0.95 ml.) followed by one drop of pyridine. The mixture was stirred at 0° for 10 minutes, then cooled to −15° and added to an ice-cold solution of triethylammonium 6-aminopenicillanate (3.17 g.) in methylene dichloride (20 ml.). Stirring was continued for one hour whilst the mixture attained room temperature and then, after filtration, the clear yellow solution was stirred for 30 minutes with aqueous 2 N hydrochloric acid (10 ml.). The layers were separated and the aqueous phase was adjusted to pH 6 by means of 5 N sodium hydroxide, kept at 0° for one hour, and filtered to give α-aminobenzylpenicillin (1.35 g.). The identity of the product was confirmed by paper chromatography, and alkalimetric assay indicated it to contain 83% of the anhydrous penicillin.

*Example 5*

Sodium N-(5-chlorosalicylidene) α-aminophenylacetate, M.P. 176–179° (decomposition), was prepared as described in Example 4 for the salicylidene analogue but using 5-chlorosalicylaldehyde (11.3 g.) instead of salicylaldehyde.

Formation of the mixed anhydride, coupling with triethylammonium 6-aminopenicillanate, and acid hydrolysis of the N-protected aminopenicillin, were carried out as described in Example 4. In this case, however, α-aminobenzylpenicillin did not crystallise, so the final aqueous solution was evaporated at low temperature and pressure. After being dried in vacuo over phosphorus pentoxide, the residue was shown by hydroxylamine assay to contain 35% of α-aminobenzylpenicillin. The identity of the product was confirmed by paper chromatography.

*Example 6*

A suspension of DL-norvaline (4.7 g.) in ethanol (200 ml.) was treated with 3,5-dichlorosalicylaldehyde (11.5 g.) and refluxed until a clear yellow solution resulted. A crystalline product separated on cooling, and a further crop was obtained by concentrating the filtrate. Recrystallisation of the combined crops from ethanol gave N-(3,5-dichlorosalicylidene)-DL-norvaline (8.5 g.), M.P. 109–111°.

This intermediate (2.9 g.) was converted into a mixed anhydride and coupled with 6-aminopenicillanic acid by the method of Example 1 to give the crude sodium salt of the appropriate N-protected α-aminobutylpenicillin (1.5 g.). A portion hydrolysed with dilute hydrochloric acid gave free α-aminobutylpenicillin, identified by paper chromatography.

We claim:
1. A process for preparing a penicillin which comprises reacting an ester of chlorocarbonic acid with an N-protected amino-substituted carboxylic acid formed by the reaction of an α-aminocarboxylic acid with a ortho-hydroxy-substituted aromatic aldehyde, contacting the resulting N-protected mixed anhydride with 6-aminopenicillanic acid at a temperature not higher than 0° C., and subjecting the N-protected penicillin to mild acid hydrolysis to obtain the desired penicillin.

2. A process for preparing an α-aminoalkyl penicillin which comprises reacting an ester of chlorocarbonic acid with an N-protected α-amino-substituted alkanoic acid formed by the reaction of an α-aminoalkanoic acid with an ortho-hydroxy-substituted aromatic aldehyde, contacting the resulting N-protected mixed anhydride with 6-aminopenicillanic acid at a temperature not higher than 0° C., and subjecting the N-protected penicillin to mild acid hydrolysis to obtain the desired α-aminoalkyl penicillin.

3. A process according to claim 2 in which the alkyl penicillin is α-aminobutylpenicillin and the α-aminocarboxylic acid is DL-norvaline.

4. A process according to claim 2 in which the aldehyde is selected from the group consisting of salicylaldehyde, 5-chlorosalicylaldehyde, 3,5-dichlorosalicylaldehyde, and 2-hydroxy-1-naphthaldehyde.

5. A process for the preparation of α-aminobenzylpenicillin which comprises reacting an ester of chlorocarbonic acid with an N-protected α-aminophenylacetic acid formed by the reaction of α-aminophenylacetic acid with an ortho-hydroxy-substituted aromatic aldehyde, contacting the resulting N-protected mixed anhydride with 6-aminopenicillanic acid at a temperature not higher than 0° C., and subjecting the N-protected penicillin to mild acid hydrolysis to obtain α-aminobenzylpenicillin.

6. A process according to claim 5 in which the aromatic aldehyde is selected from the group consisting of salicylaldehyde, 5-chlorosalicylaldehyde, 3,5-dichlorosalicylaldehyde, and 2-hydroxy-1-naphthaldehyde.

References Cited by the Examiner
UNITED STATES PATENTS
2,985,648   5/1961   Doyle et al. _____ 260—239

OTHER REFERENCES

Morton, "The Chemistry of Heterocyclic Compounds," page VI.

Wertheim, "Textbook of Organic Chemistry," page 468.

NICHOLAS S. RIZZO, *Primary Examiner.*

JAMES W. ADAMS, *Assistant Examiner.*